United States Patent

Saunders et al.

[15] 3,673,142
[45] June 27, 1972

[54] PREPARATION OF STABLE LATEXES FROM ETHYLENICALLY UNSATURATED POLYMERIZABLE SURFACTANT AND SOLUTION OF PREFORMED WATER INSOLUBLE POLYMER OF AN ETHYLENICALLY UNSATURATED COMPOUND

[72] Inventors: Frank L. Saunders; David P. Sheetz, both of Midland, Mich.

[73] Assignee: The Dow Chemical Company, Midland, Mich.

[22] Filed: Feb. 16, 1970

[21] Appl. No.: 11,867

[52] U.S. Cl..........260/29.6 RW, 260/29.6 RB, 260/29.6 PT, 260/29.6 WB, 260/29.6 MH, 260/29.6 XA, 260/29.7 W, 260/29.7 WA, 260/878 R
[51] Int. Cl. .......................................................C08f 45/24
[58] Field of Search...................260/29.6 RW, 29.7 W, 29.6, 260/29.6 E, 29.6 R

[56] References Cited

UNITED STATES PATENTS

| | | | |
|---|---|---|---|
| 2,874,151 | 2/1959 | Medalia | 260/80 R |
| 3,147,301 | 9/1964 | Sheetz | 260/485 J |

*Primary Examiner*—Harold D. Anderson
*Attorney*—Griswold & Burdick, Richard G. Waterman, Lester J. Dankert and I. A. Murphy

[57] ABSTRACT

Stable latexes are prepared by mixing a polymerizable surfactant, water and a substantially water-insoluble polymer dissolved in a non-aqueous solvent to form an initial dispersion of the solution in water, subjecting the dispersion to emulsion polymerization conditions, evaporating the solvent and optionally concentrating the remaining aqueous dispersion.

14 Claims, No Drawings

3,673,142

PREPARATION OF STABLE LATEXES FROM ETHYLENICALLY UNSATURATED POLYMERIZABLE SURFACTANT AND SOLUTION OF PREFORMED WATER INSOLUBLE POLYMER OF AN ETHYLENICALLY UNSATURATED COMPOUND

BACKGROUND OF THE INVENTION

1. Field of the Invention

This invention relates to aqueous colloidal dispersions of substantially water-insoluble particles and especially of organic polymers, commonly called latexes, and more especially to a process for preparing such compositions.

2. Description of the Prior Art

The preparation of stable latexes containing high polymers by emulsion polymerization of monomers has been known fro several decades. However, it is often desired to convert to latex form already-prepared solid rubbery or resinous materials or solutions thereof; e.g., such as those prepared using Friedel-Crafts catalysts, alkali metal catalysts or by the Ziegler-Natta polymerization technique. Aqueous colloidal dispersions, i.e., latexes, of these polymeric materials customarily are prepared by emulsification in water of a solution of the materials in a suitable hydrophobic solvent in the presence of a conventional emulsifier, or surfactant. The solvent is then stripped from the resulting aqueous dispersion by steam distillation to form a latex. Usually the dilute latex thus obtained is then concentrated by creaming or removal of water by distillation. The preparation of the initial emulsion requires a large amount of emulsifier which causes excess foaming during the solvent removal step. The course of the emulsification and the stability of the final latex are also influenced strongly by the surfactant or emulsifier. The large amounts of emulsifier required also affect the physical and chemical properties of the latex product.

SUMMARY OF THE INVENTION

A major object of this invention is to provide a method for preparing stable latexes of preformed polymers in which foaming difficulties are reduced compared to earlier methods during the preparation steps.

Another object of the invention is to provide a process and surfactant system which will provide as a product a latex which is highly stable during subsequent processing steps and in storage.

A further object of the invention is to provide a latex having no emulsifier micelles in the aqueous phase, the latex thus being suitable for further modification by grafting or by polymerization of other monomers on the surface or within the latex particles without initiation of new latex particles.

The process of this invention is an improvement in the preparation of latexes from preformed polymers. The process comprises mixing a polymerizable surfactant, water and a substantially water-insoluble polymer dissolved in a non-aqueous solvent to form an initial aqueous colloidal dispersion of the polymer solution, subjecting the initial dispersion to emulsion polymerization conditions to polymerize the surfactant and thereafter removing at least a predominant proportion of the solvent. Optionally, the resulting latex product may be concentrated to a desired degree up to about 70 percent solids content.

Representative uses are the preparation of films, coatings, binders and adhesives.

DESCRIPTION OF THE PREFERRED EMBODIMENTS

The latexes provided by this invention are prepared from pre-formed substantially water-insoluble polymers, a non-aqueous solvent, a polymerizable surfactant and water. By the term "substantially water-insoluble polymers" is meant the polymers are soluble to an extent of less than about 0.5 percent be weight in water. The pre-formed polymers may vary widely in composition. While not restricted thereto, the method advantageously is used with polymers which are not prepared readily from monomers by emulsion polymerization, either because no substantial polymerization at a commercially acceptable rate is obtained under usual emulsion polymerization conditions, such as with isobutene, or because a particularly desirable form of the polymerized monomer is required, for example stereospecific polyisoprene, stereospecific polybutadiene and the like. Representative preformed polymers are polymers and copolymers of the mono-olefins having from two to 20 carbon atoms such as ethylene, propylene, 1-butene, 2-butene, isobutene, pentene, hexene, octene, dodecene, hexadecene, octadecene, and especially those mono-olefins having up to eight carbon atoms. An especially common type are the ethylene/propylene copolymers. However, other substantially water-insoluble polymers can be used such as polymers and copolymers of the alkenyl aromatic compounds, i.e., the styrene compounds; the derivatives of a α-methylene monocarboxylic acids such as the acrylic esters, acrylic nitriles and methacrylic esters; derivatives of $\alpha,\beta$-ethylenically unsaturated dicarboxylic acids such as maleic esters; unsaturated alcohol esters; conjugated dienes; unsaturated ketones; unsaturated ethers; and other polymerizable vinylidene compounds such as halosubstituted olefins, e.g., vinyl chloride and vinylidene bromide. Specific examples of such ethylenically unsaturated compounds are styrene, α-methylstyrene, ar-methylstyrene, ar-ethylstyrene, α-ar-dimethylstyrene, ar,ar-dimethylstyrene, vinylnaphthalene, hydroxystyrene, methoxystyrene, cyanostyrene, acetylstyrene, monochlorostyrene, dichlorostyrene, and other halostyrenes, divinylbenzene, methyl methacrylate, ethyl acrylate, butyl acrylate, hexyl acrylate, 2-ethylhexyl acrylate, lauryl methacrylate, phenyl acrylate, acrylonitrile, methacrylonitrile, acrylanilide, ethyl α-chloroacrylate, ethyl maleate, vinyl chloride, vinyl bromide, vinylidene chloride, vinylidene bromide, vinyl methyl ketone, methyl isopropenyl ketone, vinyl ethyl ether, 1,3-butadiene, isoprene and the like. Also included are block and graft copolymers, e.g., styrene/butadiene graft and block copolymers. Methods for preparing the above-described polymers are well known and are not a part of this invention.

Minor amounts, such as up to about 7 percent by weight, of monomers which contribute some hydrophylic character to a polymer are often copolymerized with the above mentioned monomers to form the starting polymers of this invention. Such monomers are represented by the $\alpha,\beta$-ethylenically unsaturated carboxylic acids such as acrylic acid, methacrylic acid, ethacrylic acid, maleic acid, fumaric acid, itaconic acid, aconitic acid; hydroxy alkyl esters of $\alpha,\beta$-ethylenically unsaturated carboxylic acids such as β-hydroxyethyl acrylate, β-hydroxypropyl acrylate, β-hydroxyethyl methacrylate, 4-hydroxybutyl acrylate, 4-hydroxybutyl methacrylate and 5-hydroxyamyl methacrylate; the sulfoalkyl esters of $\alpha,\beta$-ethylenically unsaturated carboxylic acids such as 2-sulfoethyl acrylate and 2-sulfoethyl methacrylate; the aminoalkyl esters of $\alpha,\beta$-ethylenically unsaturated carboxylic acids such as 2-aminoethyl methacrylate hydrochloride, 2-aminoethyl acrylate hydrochloride, 2-methylaminoethyl acrylate hydrochloride, and 3-methylaminopropyl methacrylate hydrochloride; amides and substituted amides of $\alpha,\beta$-unsaturated carboxylic acids such as acrylamide, methacrylamide, N-methylol acrylamide, and N-methylol methacrylamide; and certain styrene derivatives such as styrene sulfonamide, sodium styrene sulfonate and sodium α-methylstyrene sulfonate.

The polymers and copolymers, however, to be useful in the practice of this invention must be soluble in a non-aqueous solvent to an extent of at least 5 percent by weight. However, once the preformed polymers are converted to latexes by the method of the invention, they may be subsequently converted, if desired to the insoluble state such as by crosslinking.

The polymer solvents which are used in the practice of this invention desirably have a boiling point below the boiling point of pure water or form an azeotrope with water which has a boiling point below that of pure water. While in some instances the solvent may be somewhat soluble in water, usually the solvents are substantially water-insoluble. The somewhat water-soluble solvents are represented by the alcohols, ethers and ketones having from one to four carbon atoms such as methyl alcohol, ethyl alcohol, n-propyl alcohol, isopropyl alcohol, n-butyl alcohol, sec-butyl alcohol, isobutyl alcohol, tetrahydrofuran, 1,4-dioxane, acetone and methyl ethyl ketone. The water-insoluble solvents typically are organic liquids including the aliphatic, cyclic aliphatic, and aromatic hydrocarbons such as pentane, hexane, heptane, octane, nonane, decane, benzene, toluene, xylene, cyclohexane, methyl cyclohexane, and the like and the chlorinated hydrocarbons, such as methylene chloride, chlorobenzene, and dichlorobenzene. Preferred solvents are those which can be removed by azeotropic distillation of the solvent and water such as toluene and benzene. Aromatic hydrocarbons such as toluene and benzene are especially preferred in making solutions of polymers of the monovinylidene aromatics and copolymers of olefins, conjugated dienes, ethylenically unsaturated esters and the like.

The polymerizable surfactants applicable to the process of this invention are ethylenically unsaturated compounds which possess the inherent capability of decreasing the surface tension of water, exhibit a critical micelle concentration at 25° C. in pure water of less than 0.5 mole per liter and structurally have a hydrophobic portion which is predominantly hydrocarbon and a hydrophilic portion which may be anionic, cationic or non-ionic. These polymerizable surfactants ordinarily are soluble in water to an extent of at least 1 percent by weight at 25° C. and at a concentration of 0.1 percent by weight in water are capable of reducing the air/water surface tension to less than about 40 dynes per centimeter.

Thus the polymerizable surfactants differ from ordinary surfactants in having on each molecule an ethylenically unsaturated group which is polymerizable by free-radical catalysis under emulsion polymerization conditions. This invention, however, is not directed to new polymerizable surfactants per se but rather to the use of any polymerizable surfactant in the manner described elsewhere in this specification to produce a latex having good dispersion stability and to the products thus obtained. One class of polymerizable cationic surfactants consists of monomer compounds of the formula

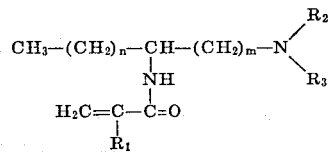

where $R_1$ represents H or $CH_3$; $R_2$ and $R_3$ each represent H, an alkyl group, containing from one to 18, and preferably no more than six carbon atoms, or an alkaryl group wherein the alkyl portion contains no more than two carbon atoms and the nitrogen atom of the amino group is attached to an aliphatic carbon atom of the alkaryl group; where $m$ is an integer from two to 18; $n$ is an integer from 0 to 16, and where $m$ plus $n$ ranges from 10 to 18. These polymerizable compounds can be prepared by contacting an amine e corresponding to the formula

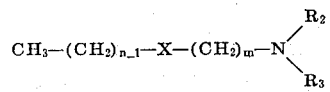

where X is a divalent organic radical chosen from the group consisting of

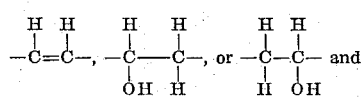

$R_2$, $R_3$, $m$ and $n$ are the same as indicated previously with acrylonitrile or methacrylonitrile in the presence of a strong acid, such as concentrated sulfuric acid. The reaction mixture is maintained at a temperature usually from about 20° C. to about 50° C. and agitated, such as by stirring, for a sufficient period of time to allow a substantially complete reaction to occur. The reaction mixture is admixed with water and the crude product, a salt of the monomer compound corresponding to the acid employed, usually in the form of a yellow waxy compound, is filtered out. The strong acids employed in the method may consist of strong mineral acids, such as sulfuric or phosphoric acid. About 90 to 100 percent acids are preferred and 97 percent sulfuric acid was employed in the examples of preparation of the novel compounds described herein. The crude product is usually alkalized with a strong base, such as, for example, sodium hydroxide, and taken up in an inert solvent such as, for example, methylene chloride. The product monomer amine is precipitated out of the solvent solution by the addition of a non-polar solvent, such as n-hexane.

Unsaturated and hydroxy amines such as, for example, hydroxystearylamines, octadecenylamines, N-substituted hydroxystearylamines and N-substituted octadecenylamines may be employed as the amine starting material in the preparation of the polymerizable surfactants. Other specific amines include, for example, 3-octadecenyldiethylamine, oleylbenzylamine, oleylmethylamine, 7-hydroxystearyl-methylamine, 5-octadecenyl-tert-butylamine, 4-dodecenyl-dimethylamine, 5-hydroxydodecylamine, 6-tetradecenylamine, 8-eicosenylamine and other like amines which correspond to the formula as previously set forth.

The molar ratio of the initial reactants preferably is maintained at about 1:5:5 (starting amine compound: nitrile compound:acid) respectively. Higher or lower molar ratios are operable; however, they may affect the yield and purity of the product.

Other polymerizable cationic surfactants corresponding to the formula

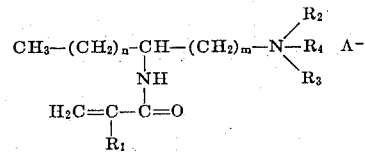

wherein $R_1$, $R_2$, $R_3$, $m$ and $n$ are the same as previously indicated, $R_4$ is H or a lower alkyl group, preferably containing from one to five carbon atoms, and $A^-$ is an anion of a salt forming acid, can be prepared from the above noted surfactants by a further reaction thereof with a salt forming acid or a quaternary ammonium salt-forming compound such as ethyl chloride, methyl bromide, and amyl iodide. The salt-forming acids include, for example, hydrochloric acid, hydrobromic acid, sulfuric acid, toluene sulfonic acid, nitric acid, acetic acid and the like. Salts of the monomer compound include, for example, hydrochloric salts, hydrobromide salts, hydrogen sulfonic salts, toluene sulfonic salts, nitric acid salts, acetic acid salts and other like salts of salt forming acids. Quaternary ammonium salts of the monomer compound include, for example, ethylchloride salts, methylbromide salts, pentyliodide salts and the like.

Another class of polymerizable cationic surfactants consist of the monomer compounds of the formula

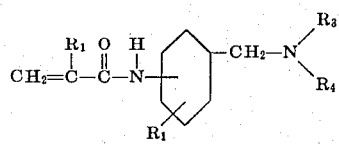

wherein $R_1$ and $R_2$ represent H or $CH_3$; $R_3$ and $R_4$ each represent H, an alkyl group containing from one to 18 and preferably no more than six carbon atoms, or an alkaryl group containing no more than two carbon atoms in the alkyl portion and wherein the nitrogen atom of the aminomethyl group is attached to an aliphatic carbon atom of the alkaryl group; wherein the aminomethyl group is preferably located on the second or third carbon atom of the cyclohexyl ring from the acrylamide group and wherein the $R_2$ group is preferably attached to the same carbon atom of the cyclohexyl ring as is the acrylamide group.

The monomer compounds are prepared by contacting an amine corresponding to the formula

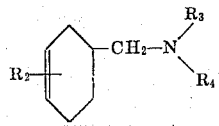

where $R_2$, $R_3$, and $R_4$ are the same as indicated hereinbefore, with acrylonitrile or methacrylonitrile in the presence of a strong acid such as, for example, sulfuric acid. The reaction mixture is usually maintained at a temperature below 40° C. and agitated, such as by stirring, for a sufficient period of time to allow a substantially complete reaction to occur. The reaction product mixture is then usually added to an ice and water mixture and unreacted nitrile compounds are extracted with an inert solvent, such as, for example, methylene chloride. The crude aqueous product mixture containing the salt of the monomer compound corresponding to the acid employed, is usually alkalized with a strong base, such as sodium hydroxide, and unreacted amines are separated from the monomer compounds by washing the product mixture with an amine soluble solvent such as, for example, n-hexane.

Examples of starting amines which may be employed herein consist of 1-methyl-3(and 4)-(amino-methyl)cyclohexene, 3(and 4)-(aminomethyl)cyclohexene and substituted amines such as 1-methyl-3(and 4)-(diethylaminomethyl)cyclohexene, 1-methyl-3(and 4)-(octadecylaminomethyl)cyclohexene, 1-methyl-3(and 4)-(di-tert-butylaminomethyl)cyclohexene, 3(and 4)-diethylaminomethyl)-cyclohexene, 3(and 4)-(methylpropylaminomethyl)cyclohexene, 1-methyl-3(and 4)-(methylpropylaminomethyl)cyclohexene, 1-methyl-3(and 4)-(ethylpentylaminomethyl)cyclohexene, 1-methyl-3(and 4)-(methyloctadecylaminomethyl)cyclohexene, 3(and 4)-(octadecylaminomethyl)cyclohexene and other like cyclohexenyl methylamino compounds.

The temperature during the initial addition of the reactants preferably should be less than 40° C. The reaction itself can be carried out at about 20° C. to 50° C. after all the reactants have been mixed together. Preferably the temperature should not exceed 40° C. at any time during the reaction or purifying steps, especially during the addition of the base, since the product may polymerize. Polymerization inhibitors may be used to prevent the polymerization of the monomer compounds during the initial preparation steps.

Reaction time varies accordingly with the temperature at which the reaction proceeds. It has been observed that no exotherm has existed 2 to 3 hours after the reactants have been completely mixed, indicating a corresponding reaction time.

The strong acids employed in the method of the present invention may consist of strong mineral acids, such as sulfuric or phosphoric acid. About 90 to 100 percent strong acids are preferred, and in the examples herein of the preparation of the novel compounds 97 percent sulfuric acid was employed.

The molar ratio of the initial reactants may vary from about 1:1.2:2 to 1:3:6, (methylaminocyclohexene compounds:nitrile compounds:acid), respectively. Molar ratios of less than about 1:1.2:2 are not desirable because the mixtures are too viscous and cannot be stirred effectively.

The reaction ordinarily goes to about 95 percent completion. There is some loss of product because of the solubility of the initial reactant amine in water. Most of the loss of the product occurs during the step of the process where the unreacted starting amine is extracted out of the aqueous phase with an inert solvent. This loss of product can be kept at a minimum by saturating the aqueous phase with an alkali metal sulfate such as, for example, $Na_2SO_4$.

Salts of the monomer compound corresponding to the formula

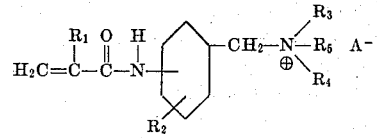

wherein $R_1$, $R_2$, $R_3$ and $R_4$ are the same as previously indicated and where $R_5$ represents H or a lower alkyl group, preferably containing from one to five carbon atoms, and $A^-$ represents an anion of a salt forming acid also are suitable for use in the present invention.

Salt forming acids include, for example, hydrochloric acid, hydrobromic acid, sulfuric acid, toluene-sulfonic acid, nitric acid, acetic acid and other like salt forming acids. Lower alkyl halides as employed herein to prepare the novel quaternary ammonium salts of the monomer compound usually contain from 1 to about 5 carbon atoms and include, for example, ethylchloride, methylbromide, pentyliodide and the like. These salts are considered to be within the scope of the present invention and may be prepared by dissolving the novel monomer compounds, as previously described, in an aqueous solution of the salt forming acid, or for example in an aqueous solution of a lower alkyl halide.

Polymerizable anionic surfactants also are operable in the practice of this invention. One subclass of such surfactants is similar to the above-described cationic surfactants except that the hydrophilic group; i.e.,

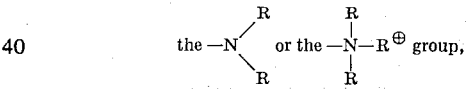

is replaced by an anionic group such as carboxyl or carboxyl salt group, e.g., alkali metal, ammonium, or low molecular weight amine carboxylate salt groups. Illustrative polymerizable anionic surfactants are the acrylamido and methacrylamido fatty acid compounds described and claimed in U.S. Pat. No. 2,701,809, incorporated herein by reference. Especially pertinent are the compositions of claim 11 thereof. Other pertinent passages are found at col. 1, lines 48–80; Col. 2, lines 1–6, 15–24; col. 3, lines 1–5, 45–60 especially Examples 9, 12, 16 and 17 as to the latter passage.

Other polymerizable anionic surfactants are represented by allyl-α-sulfopalmitic acid, allyl-α-sulfostearic acid and the alkali metal salts, such as the sodium or potassium salts, and the ammonium and lower molecular weight amine salts of such acids.

Still other polymerizable anionic surfactants are the styryl emulsifying agents. Illustrative such compounds which are operable in the practice of this invention are the acids and salts described and claimed in U.S. Pat. No. 2,868,814, incorporated herein by reference. Especially pertinent are the acids and salts of claims 1, 2 and 3 thereof, such as compounds of the structures

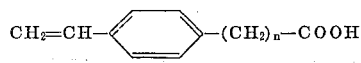

where $n$ can be from 4 to 16,

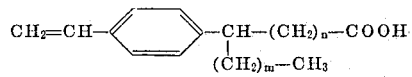

where $n$ can be from 4 to 12 and $n + m$ can be from 4 to 16, and salts thereof. Especially pertinent passages in the patent are found at col. 1, lines 45–68 and at col. 3, lines 16–50. A further disclosure of the same kind of polymerizable surfactants is given in U.S. Pat. No. 2,874,151, also incorporated herein by reference. Also disclosed therein are similar materials except that, for the carboxyl or carboxylic salt hydrophilic group, there is substituted a sulfate or sulfonate group, especially in their salt form, such as the sodium, potassium and ammonium salts. Also useful are similar compounds where

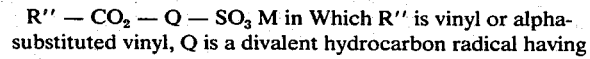 is substituted for 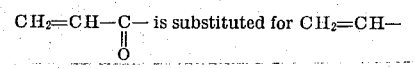

Especially pertinent passages of U.S. Pat. No. 2,874,151 are found at col. 1, lines 31–69; col. 2, lines 1–9 and 15–57; and col. 4, lines 37–72.

Still other polymerizable anionic materials represented by the formula

R'' — $CO_2$ — Q — $SO_3$ M in Which R'' is vinyl or alpha-substituted vinyl, Q is a divalent hydrocarbon radical having its valence bonds on different carbon atoms and M is a cation, are described and claimed in U.S. Pat. No. 3,024,221, incorporated herein by reference. Such compounds are polymerizable surfactants operable in the practice of this invention when Q is sufficiently hydrophobic. For use in the present invention Q usually has at least eight and preferably from 12 to 18 carbon atoms. Especially pertinent passages in the patent are found at col. 1, lines 21–72; col. 2, entire, col. 3, entire; col. 4, lines 1–47 and claims 1, 6 and 120.

Polymerizable non-ionic surfactants likewise are operable in the practice of this invention. One representative subclass of such non-ionic surfactants are the polyoxyethylene derivatives of the various polymerizable surfactants described above which contain a carboxylic acid, i.e., —COOH, group. Such derivatives which are particularly desirable for use in the present invention are those which have an average of from about 3 moles to about 20 moles of ethyleneoxy units per mole of carboxylic acid groups or equivalent compositions, that is, polymerizable surfactants in which the hydrophilic group is — COO—$(CH_2CH_2O)_nH$ in which $n$ averages from 3 to 20. Some polymerizable non-ionic surfactants which are operable in the practice of this invention, i.e., the polyoxyethylene esters of p-styrylundecanoic acid, are claimed in U.S. Pat. No. 2,868,814, claim 4.

Another subclass of polymerizable non-ionic emulsifiers which are used in this invention has the formula

wherein R' is alkyl, cycloalkyl, aryl, aralkyl, or alkaryl and has at least six carbon atoms, R'' is an alkylene having from two to four carbon atoms with the proviso that at least 10 percent by weight of the R''O units are $CH_2CH_2O$ units, R''' is vinyl or allyl, and $n$ is a number from 5 to 100. When R''' is allyl, these surfactants are prepared by reacting in benzene or toluene solution at a temperature from about 40° C. to about 100° C., optionally at elevated pressure, an alcohol of the formula R'O(R''O)$_n$H, wherein R',R'' and n are as shown above, with an allyl halide, such as allyl chloride or allyl bromide, in the presence of an alkali metal or alkali metal hydroxide. When R''' is $CH_2$ = CH —, the surfactant is prepared in a similar manner by reacting, in benzene or toluene solution at a temperature from about 120° C. to about 200° C., an alcohol of the same formula with acetylene in the presence of an alkali metal or an alkali metal hydroxide.

The polymerizable surfactants described above are illustrative but not limiting examples of surfactants which may be used in the practice of this invention. The requirements generally are that the operable materials must be surfactants in the monomeric state and also must be polymerizable. The passage in U.S. Pat. No. 2,874,151 (incorporated by reference supra) at col. 1, lines 31–68 and col. 2, lines 1–9 and 15–54 summarizes their general characteristics.

The process of this invention comprises emulsification of a solution of a preformed polymer in an aqueous medium, said emulsification being carried out with a polymerizable surfactant, polymerizing in situ the polymerizable surfactant, removing at least a predominant portion of the solvent to obtain an aqueous dispersion of the polymer and optionally concentrating the aqueous dispersion to from about 40 percent to about 70 percent of solids.

The solution of the polymer must be in the form of a fluid, stirrable liquid in order to be readily emulsified in the aqueous liquid or vice versa. The fluidity (inversely related to viscosity) of the polymer solution is dependent in part on the molecular weight and molecular structure of the polymer, the concentration of polymer in the solution and the like. Usually it is the best practice to lower viscosity (i.e., increase the fluidity) of the polymer solution by diluting the polymer solution with additional polymer solvent. In general, polymer solutions utilized in the method of this invention contain up to about 25 weight percent polymer solids, with the preferred solutions having from about 5 to about 20 weight percent. In order to minimize the amount of solvent which must be removed subsequently, it is preferable to maximize polymer concentration within the limits set by viscosity requirements.

Formation of the initial aqueous dispersion of polymer solution, i.e., emulsification of the polymer solution, is accomplished by conventional methods except that a polymerizable surfactant is used rather than an ordinary surfactant. The polymerizable surfactant, the polymer solution and an aqueous medium are brought together by simultaneous, alternate or continuous addition of the components with suitable mixing. The mixing is readily accomplished with a conventional mixing device; e.g., Waring Blendor, colloid mill, high pressure homogenizer and the like, operating at a high rate of agitation; e.g., up to 8,400 rpm, for periods from about 5 to about 30 minutes, or in some cases by sue of a simple stirrer operating at a lower rate of agitation. Best results are obtained, however, by mixing at a high rate of agitation at a temperature from about 40° C. to about 100° C. for from about 5 to about 10 minutes.

After formation of the initial emulsion, the surfactant is polymerized in situ by free-radical catalysis usually by the addition of a material such as sodium persulfate, which is a free-radical catalyst, and by agitation at an elevated temperature substantially in the same manner and for the same time as in usual emulsion polymerization. Such temperatures and times are represented by, but not restricted to, from about 50° C. to about 100° C. and from about 2 hours to about 30 hours.

The polymer solvent is normally stripped from the emulsion at elevated temperatures until no more solvent can be removed, preferably by azeotropic distillation of the solvent and water. The polymer solvent may be removed under reduced pressure, as a result of the reduced tendency to foaming provided by this invention. After the resulting latex is substantially free of solvent, a portion of water may be evaporated or distilled under reduced pressure if a higher solids latex is desired. Other methods of removing water include creaming and centrifuging. Latexes prepared by this method usually contain between about 25 and about 40 weight percent polymer solids prior to concentration and up to about 70 percent afterwards. Concentration of the latex, however, is an optional step.

Small amounts of other materials may be dispersed in either the polymer solution or the aqueous phase of the emulsion. Materials which may be present in concentrations up to 5 percent by weight based on the polymer include carbon black, clay fillers, plasticizers, antioxidants, thickeners, catalyst decomposition products, etc. Other materials which may be dissolved in the polymer solution or the aqueous phase of the emulsion in similar concentrations include electrolytes, buffers, and the like. If such materials are present in larger quantities they may tend to interfere with emulsification, or other steps of the process. Nevertheless, these materials may be added in larger quantities to the product obtained from the process, if desired, although additional surfactant may be required with large quantities of additives such as plasticizers and fillers.

The latexes prepared by the method of this invention are suitable for a wide variety of uses such as the preparation of films, coatings, latex foam, dipped goods, emulsion paints, binders and adhesives. Furthermore, the latex products are particularly adapted for further modification by grafting or polymerization of other monomers on the surface of the latex products or within the latex particles, since the method of the invention uses a surfactant which is polymerized during the process so that there are no remaining surfactant micelles to initiate new latex particles during polymerization of the added monomers.

The following examples are given to illustrate more clearly the principle and practice of this invention to those skilled in the art and are not for the purpose of limitation. Throughout this specification and claims, all parts and percentages are by weight unless otherwise indicated.

EXAMPLE 1

To a solution in 500 parts of toluene of 50 parts of a saturated amorphous copolymer of approximately equal proportions of copolymerized ethylene and propylene, having a Mooney viscosity of 40 and a specific gravity of 0.86, is added 4.7 parts of an aqueous paste containing 61 percent of 9-(and 10-)acrylamidostearic acid (prepared and purified as described in U.S. Pat. No. 3,444,219) and the resulting mixture is blended in an Eppenbach Homomixer. To that blend, while still being mixed, is added slowly 500 parts of water containing sufficient sodium hydroxide to neutralize the acrylamidostearic acid. In the initial stages a water-in-oil emulsion is formed but during the addition of water, the water-in-oil emulsion inverts to form an oil-in-water emulsion. By the time all of the water is added and the material is converted to an oil-in-water emulsion the temperature of the emulsion is 60° C. That emulsion and 0.5 part of sodium persulfate in 10 parts of water are introduced into a reactor which is then purged with nitrogen. The neutralized acrylamidostearic acid (included in the reactor contents) is polymerized in situ under an atmosphere of nitrogen by heating the contents of the reactor to 70° C. and maintaining that temperature for 16 hours while agitating the reactor contents with a paddle-type stirrer. The resulting emulsion is then subjected to steam distillation to strip the polymer solvent, i.e., the toluene from the system. The dilute latex product is then concentrated by vacuum distillation in a Buchi Rotavapor. During the stripping and concentration steps, no problem of foaming is encountered. The concentrated latex product is found to have a solids content of 44.3 percent.

A portion of the latex product is subjected to a stability test as follows:

The portion of latex to be tested is adjusted to a solids content of 40 percent and 10 cubic centimeters of the adjusted latex is placed in a graduated centrifuge tube and centrifuged at 2,350 rpm for 1 hour at room temperature in an International Clinical Centrifuge. The stability is measured according to the amount of the lower aqueous phase which separates during centrifugation. The stability of the latex is inversely related to the amount of clear aqueous phase which separates.

In this test, the latex product is found to produce a clear aqueous phase of 6 percent.

Comparative Process A (not an example of the invention)

The procedure of Example 1 is carried out except that the polymerization step is eliminated. A large amount of foam is encountered in the steam distillation step thus requiring considerable care in carrying out that step. However, a latex is obtained which after concentration has a solids content of 51 percent. When the latex product is subjected to the stability test described in Example 1, a clear aqueous phase constituting 35 percent of the total sample is obtained.

Comparative Process B (not an example of the invention)

When a process is carried out as in Comparative Process A except that oleic acid is used as the emulsifier rather than acrylamidostearic acid, essentially the same results are obtained as in Comparative Process A. The clear aqueous phase in the stability test, for example, is 37 percent of the total sample.

EXAMPLES 2–8

Essentially the same results are obtained as in Example 1, when for the acrylamidostearic acid there is substituted the polymerizable surfactants shown below:

Example 2, allyl α-sulfopalmitate;

Example 3, the ammonium salt of 9-(and 10-) acrylamidostearic acid;

Example 4, sodium 9-(and 10-) acrylamidostearyl sulfate;

Example 5, a mixture of sodium 9-(and 10-) acrylamidostearyl sulfate and 9-(and 10-) acrylamidostearyl alcohol;

Example 6, 0.4 percent based on the weight of polymer of N,N-dimethylaminoethyl methacrylate hydrochloride and 0.05 percent of dodecylamine hydrochloride;

Example 7, a surfactant prepared by the reaction of ethylene oxide with 10-p-styrylundecanoic acid in the ratio of 10 moles of ethylene oxide per mole of the acid;

Example 8, a mixture of 1-sulfo-2-dodecyl methacrylate and 2-sulfo-1-dodecyl methacrylate.

That which is claimed is:

1. A process for preparing a stable latex from materials consisting essentially of water, a polymerizable surfactant and a solution of a pre-formed substantially water-insoluble solid polymer of an ethylenically unsaturated compound in a non-aqueous solvent therefor by steps comprising
   1. forming an initial colloidal dispersion in the water of the solution of polymer and the polymerizable surfactant;
   2. polymerizing in situ at least a predominant proportion of the polymerizable surfactant by subjecting the initial colloidal dispersion to emulsion polymerization conditions, and
   3. removing at least a predominant proportion of the solvent;

said solvent having a boiling point below that of pure water or being capable of forming an azeotrope with water which has a boiling point below that of pure water; and said polymerizable surfactant being an ethylenically unsaturated compound which has a hydrophobic portion which is predominantly hydrocarbon, a hydrophilic portion which is anionic, cationic or non-ionic and said polymerizable surfactant being soluble in water to an extent of at least 1 per cent by weight at 25° C., being capable of reducing the air/water surface tension to less than 40 dynes per centimeter at a concentration of 0.1 per cent by weight in water as determined at 25° C. and exhibiting a critical micelle concentration in pure water of less than 0.5 mole per liter at 25° C.

2. The process of claim 1 which has an additional step of concentrating the latex product to a solids content of from about 40 percent to about 70 percent by weight based on the total weight of the concentrated latex.

3. The process of claim 1 in which the solvent is a liquid which forms an azeotrope with water having a boiling point lower than the boiling point of pure water.

4. The process of claim 1 in which the hydrophilic portion of the polymerizable surfactant is cationic.

5. The process of claim 1 in which the hydrophilic portion of the polymerizable surfactant is non-ionic.

6. The process of claim 1 in which the hydrophilic portion of the polymerizable surfactant is anionic.

7. The process of claim 1 in which the polymerizable surfactant is an acrylamido compound.

8. The process of Claim 1 in which the polymerizable surfactant is a sulfo ester of an α-methylene carboxylic acid.

9. The process of Claim 4 in which the polymerizable surfactant is a salt of N,N-dimethylaminoethyl methacrylate and a salt-forming acid.

10. The process of claim 5 in which the hydrophilic portion is — COO —$(CH_2CH_2O)_n$ H, wherein $n$ averages from about 3 to about 20.

11. The process of claim 6 in which the hydrophilic portion is a carboxylic acid group or a salt thereof.

12. The process of claim 6 in which the surfactant is allyl α-sulfopalmitate.

13. The process of Claim 7 in which the polymerizable surfactant is 9-acrylamidostearic acid, 10-acrylamidostearic acid, a mixture thereof or a salt thereof.

14. The process of Claim 7 in which the polymerizable surfactant is 9-acrylamidostearyl sulfate, 10-acrylamidostearyl sulfate, a mixture thereof or an alkali metal salt or an ammonium salt thereof.